(12) United States Patent
Mordeglia et al.

(10) Patent No.: US 11,382,191 B2
(45) Date of Patent: *Jul. 5, 2022

(54) APPARATUS AND METHOD TO ELECTRICALLY POWER AN ELECTRIC ARC FURNACE

(71) Applicant: DANIELI AUTOMATION S.P.A., Buttrio (IT)

(72) Inventors: Antonello Mordeglia, Bangkok (TH); Enzo Gigante, Porpetto (IT)

(73) Assignee: DANIELI AUTOMATION S.P.A., Buttrio (IT)

( * ) Notice: Subject to any disclaimer, the term of this patent is extended or adjusted under 35 U.S.C. 154(b) by 211 days.

This patent is subject to a terminal disclaimer.

(21) Appl. No.: 16/284,925

(22) Filed: Feb. 25, 2019

(65) Prior Publication Data

US 2019/0191502 A1 Jun. 20, 2019

Related U.S. Application Data

(63) Continuation of application No. 14/857,697, filed on Sep. 17, 2015, now Pat. No. 10,219,331.

(30) Foreign Application Priority Data

Jul. 30, 2015 (IT) ........................ 102015000040259

(51) Int. Cl.
*H05B 7/152* (2006.01)
*H05B 7/20* (2006.01)
(Continued)

(52) U.S. Cl.
CPC ............. *H05B 7/152* (2013.01); *F27B 3/085* (2013.01); *F27B 3/28* (2013.01); *F27D 11/08* (2013.01);
(Continued)

(58) Field of Classification Search
CPC .......... H05B 7/00; H05B 7/005; H05B 7/144; H05B 7/148; H05B 7/152; H05B 7/20;
(Continued)

(56) References Cited

U.S. PATENT DOCUMENTS 2,828,462 A 3/1958 Edward
3,968,422 A 7/1976 Waldmann
(Continued)

FOREIGN PATENT DOCUMENTS

EP 0429774 A1 6/1991
EP 0581112 A1 2/1994
(Continued)

OTHER PUBLICATIONS

Search and Examination Report, European patent application No. EP 15185758, dated Jan. 21, 2016.
(Continued)

*Primary Examiner* — Justin C Dodson
(74) *Attorney, Agent, or Firm* — Marshall, Gerstein & Borun LLP

(57) ABSTRACT

An electric power apparatus for an electric arc furnace comprises at least one electrode and is connectable to a power network to supply to the electrode the electric energy to generate an electric arc to melt a metal mass. The apparatus comprises an electric regulation unit interposed and connected to the power network and to the electrode and configured to regulate at least one electric quantity for powering the electrode. The apparatus comprises at least one detection device to detect the electric quantity, interposed between the electrode and the electric regulation unit, a positioning device to move the at least one electrode nearer to/away from the metal mass to be melted and a control and command unit.

9 Claims, 2 Drawing Sheets

(51) Int. Cl.
*F27D 11/08* (2006.01)
*F27B 3/08* (2006.01)
*F27B 3/28* (2006.01)
*H05B 7/144* (2006.01)
*H05B 7/148* (2006.01)
*F27D 99/00* (2010.01)

(52) U.S. Cl.
CPC .............. *H05B 7/144* (2013.01); *H05B 7/148* (2013.01); *H05B 7/20* (2013.01); *F27D 2099/0021* (2013.01); *Y02P 10/25* (2015.11)

(58) Field of Classification Search
CPC ......... H05B 7/109; H05B 7/156; F27B 3/085; F27B 3/28; F27D 11/08; F27D 11/10; F27D 2099/0021
See application file for complete search history.

(56) References Cited

U.S. PATENT DOCUMENTS

| | | | |
|---|---|---|---|
| 4,320,245 A | 3/1982 | Gaydon et al. | |
| 4,388,108 A | 6/1983 | Rozenberg et al. | |
| 4,529,927 A * | 7/1985 | O'Sullivan | H02M 3/1563 323/222 |
| 4,907,244 A * | 3/1990 | Konig | H05B 3/60 373/102 |
| 5,138,630 A | 8/1992 | Suga | |
| 5,155,740 A | 10/1992 | Ao et al. | |
| 5,438,588 A | 8/1995 | Wanner | |
| 5,533,044 A | 7/1996 | Strebel | |
| 6,421,366 B1 * | 7/2002 | Breker | F27B 3/085 373/102 |
| 6,573,691 B2 * | 6/2003 | Ma | H02J 3/1864 323/209 |
| 6,696,770 B2 | 2/2004 | Nadot et al. | |
| 7,706,157 B2 | 4/2010 | Pearson et al. | |
| 2002/0122456 A1 | 9/2002 | Fishman et al. | |
| 2006/0050758 A1 | 3/2006 | Sedighy et al. | |
| 2006/0050759 A1 * | 3/2006 | Sedighy | F27D 21/00 373/108 |
| 2007/0247079 A1 | 10/2007 | Sager et al. | |
| 2008/0063024 A1 * | 3/2008 | Pasch | H05B 7/148 373/105 |
| 2011/0176575 A1 | 7/2011 | Horger et al. | |

FOREIGN PATENT DOCUMENTS

| | | |
|---|---|---|
| EP | 0895441 A1 | 2/1999 |
| JP | 02-61988 | 3/1990 |
| JP | 08-078156 | 3/1996 |
| JP | 09-274987 | 10/1997 |
| JP | 11-204250 | 7/1999 |
| JP | 2005-085711 A | 3/2005 |
| JP | 2008-202867 A | 9/2008 |
| JP | 2010-014306 A | 1/2010 |

OTHER PUBLICATIONS

Search Report and Written Opinion, Singapore Patent Application No. 10201507755V, dated Dec. 9, 2015.
Office Action for Japanese Patent Application No. 2015-183919, dated Apr. 20, 2016.

* cited by examiner

APPARATUS AND METHOD TO ELECTRICALLY POWER AN ELECTRIC ARC FURNACE

FIELD OF THE INVENTION

The present invention concerns an apparatus and method to electrically power an electric arc furnace that allows to control the arc during the melting steps in an electric arc furnace.

In particular, the apparatus and method to electrically power the furnace allow to carry out at least two regulation modes of the power supplied by the melting arc.

BACKGROUND OF THE INVENTION

Apparatuses to electrically power the electrodes of an electric arc furnace for melting metal are known.

The electrodes are put in the electric furnace and can be moved inside it, toward/away from the metal bath, to regulate the entity of melting the solid metals.

Known electric power apparatuses comprise devices to regulate the position of the electrodes which allow to lift or lower the electrodes with respect to the metal in order to modify the length of the arc. However, regulating the position of the electrodes is rather slow, and does not allow to carry out rapid corrections if there are sudden changes in the electric power quantities or in the generation of the electric arc.

In fact, if the arc gets longer, that is, if the electrode is farther from the mass to be melted, the voltage applied has to be increased in order to support it and prevent it from switching off; if the arc is shortened, the current increases and therefore there is an uncontrolled increase in the power supplied by the arc, with possible damage to the furnace or the roof.

The arc voltage, given the same current, is proportional to the distance between the electrode and the mass to be melted. Therefore, for a given functioning condition, which provides to reach a reference current of the arc, a stable arc condition is obtained by regulating the distance between the electrode and the mass to be melted, in relation to a characteristic curve of power voltage.

Power apparatuses of the known type generally comprise a multi-tap transformer that transforms the voltage supplied by an electric power network, generally average voltage, into a voltage suitable to power the electrodes.

Through the taps of the transformer it is possible to regulate the voltage of the arc, and hence its length, to regulate the melting power.

These types of power apparatuses have a disadvantage connected to the discontinuity of instantaneous absorption of energy, which is taken from the power network and which occurs particularly at the start of melting due to the frequent short circuits caused by the instability of the arc and the slippage of the scrap. In some cases, this can entail fluctuations in the network voltage (this phenomenon is also called flicker).

Power apparatuses for electric arc furnaces are also known which comprise a straightener circuit, which transforms the alternate current supplied by the power network into direct current, and a circuit of convertors to power the electrodes.

One solution that uses a general configuration of this type to power an electric arc furnace is described for example in the patent application US2007/0247079A1 and in the patent U.S. Pat. No. 6,421,366 B1.

However, the convertor circuits present in these power apparatuses do not allow to compensate the disturbances arriving from the arc and which affect the power network. Indeed, the convertor circuits, because of the modulation of the current that is performed, generate harmonics in the current that can be harmful if introduced into the power network.

One purpose of the present invention is to obtain an apparatus and method to power an electric arc furnace that allows to regulate the melting power thereof efficiently.

Another purpose of the present invention is to obtain an apparatus and implement a method that allow to regulate the characteristics of the arc voltage and the arc current to guarantee the stability of the electric arc during melting.

Another purpose of the present invention is to obtain a power apparatus that reduces the disturbances induced in the power network compared with apparatuses of a known type.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an electric power apparatus for an electric arc furnace comprises at least one upper electrode, advantageously two or three, and is connectable to a power network to supply to the electrode the electric energy to generate an electric arc.

The apparatus comprises an electric regulation unit, interposed and connected to the power network and to the electrode and configured to regulate at least one electric quantity for powering the electrode.

According to one aspect of the present invention, the apparatus comprises at least one detection device to detect the electric quantity, interposed between the electrode and the electric regulation unit, and a positioning device configured to move the at least one electrode nearer to/away from the metal mass to be melted.

According to another aspect of the invention, the apparatus comprises a control and command unit connected to the electric regulation unit, to the power network, and to the positioning device in order to control the electric regulation unit and the positioning device and to carry out a first control of the electric arc, by acting on the electric regulation unit, and respectively a second control of the electric arc by acting on the positioning device.

In this way it is possible to achieve a mixed control apparatus in which the rapid dynamics, with a small amplitude of fluctuation, of the electric quantity, corresponding to the melting power required, is managed by the first control, that is, with a modulation of the electric quantity, while the slow dynamics, with greater amplitude, is managed by the second control, that is, by the movement of the electrodes.

Forms of embodiment of the present invention also concern a power supply method for an electric arc furnace that provides to generate an electric arc by at least one electrode powered by a power network, and to regulate at least one electric quantity for powering the electrode by means of an electric regulation unit interposed and connected to the power network and to the electrode.

According to some forms of embodiment, the method comprises detecting the electric quantity with at least one detection device interposed between the electrode and the electric regulation unit, moving the at least one electrode nearer to/away from the metal mass to be melted with a positioning device, and controlling the electric regulation unit and the positioning device in order to carry out a first control of the electric arc by acting on the electric regulation unit and respectively a second control of the electric arc by acting on the positioning device.

BRIEF DESCRIPTION OF THE DRAWINGS

These and other characteristics of the present invention will become apparent from the following description of some forms of embodiment, given as a non-restrictive example with reference to the attached drawings wherein.

Figure 1:
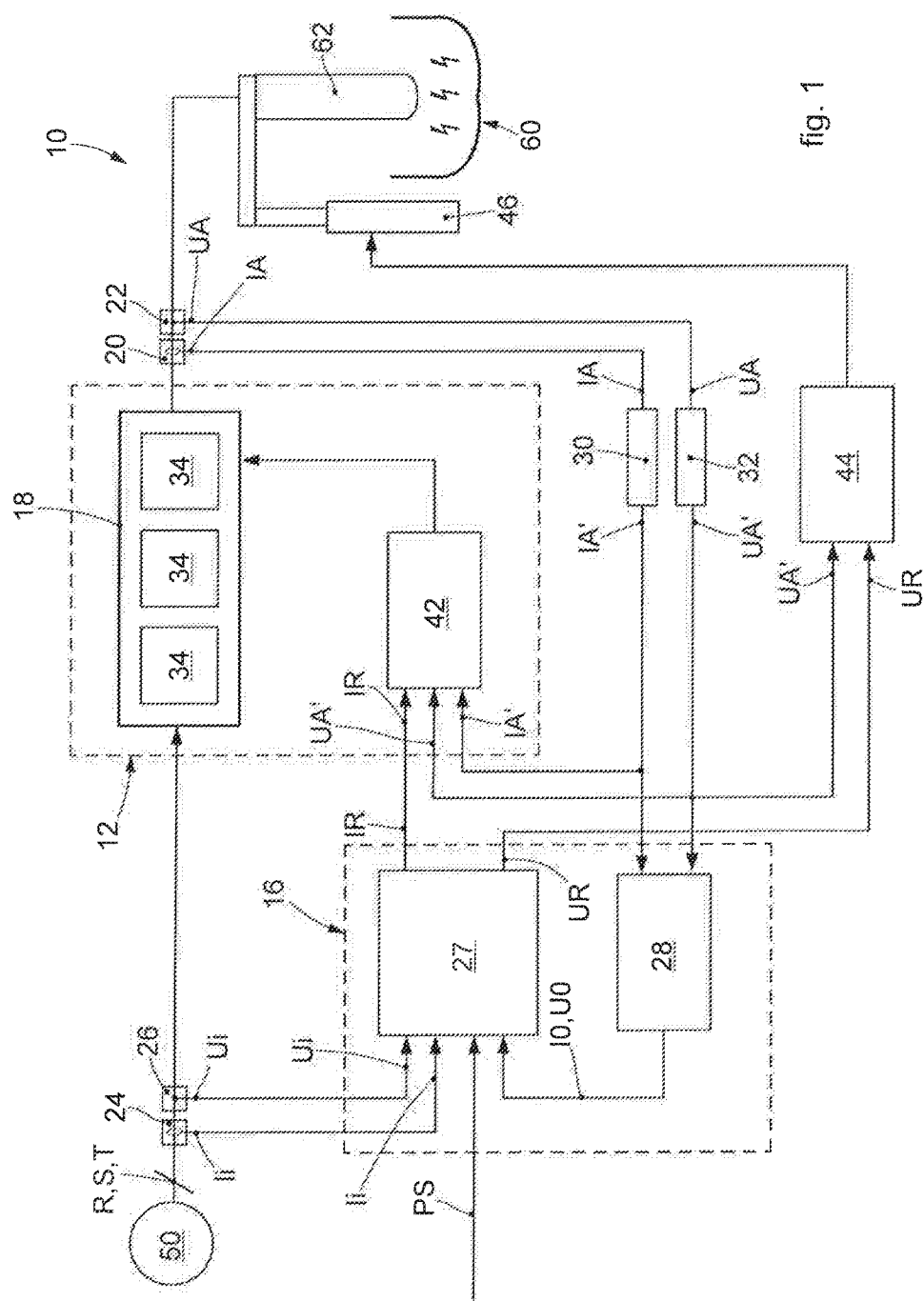
FIG. 1 is a diagram of an apparatus for powering an electric arc furnace in accordance with some forms of embodiment described here.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

We shall now refer in detail to the various forms of embodiment of the present invention, of which one or more examples are shown in the attached drawing. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

In accordance with the present description, the invention concerns an apparatus 10 for powering an electric arc furnace 60.

The electric arc furnace 60 comprises one or more electrodes 62, in this case by way of example one electrode 62, which can be electrically powered to supply the power needed to melt a metal mass.

In accordance with some forms of embodiment, there can be two, three, or more than three electrodes 62.

Figure 2:
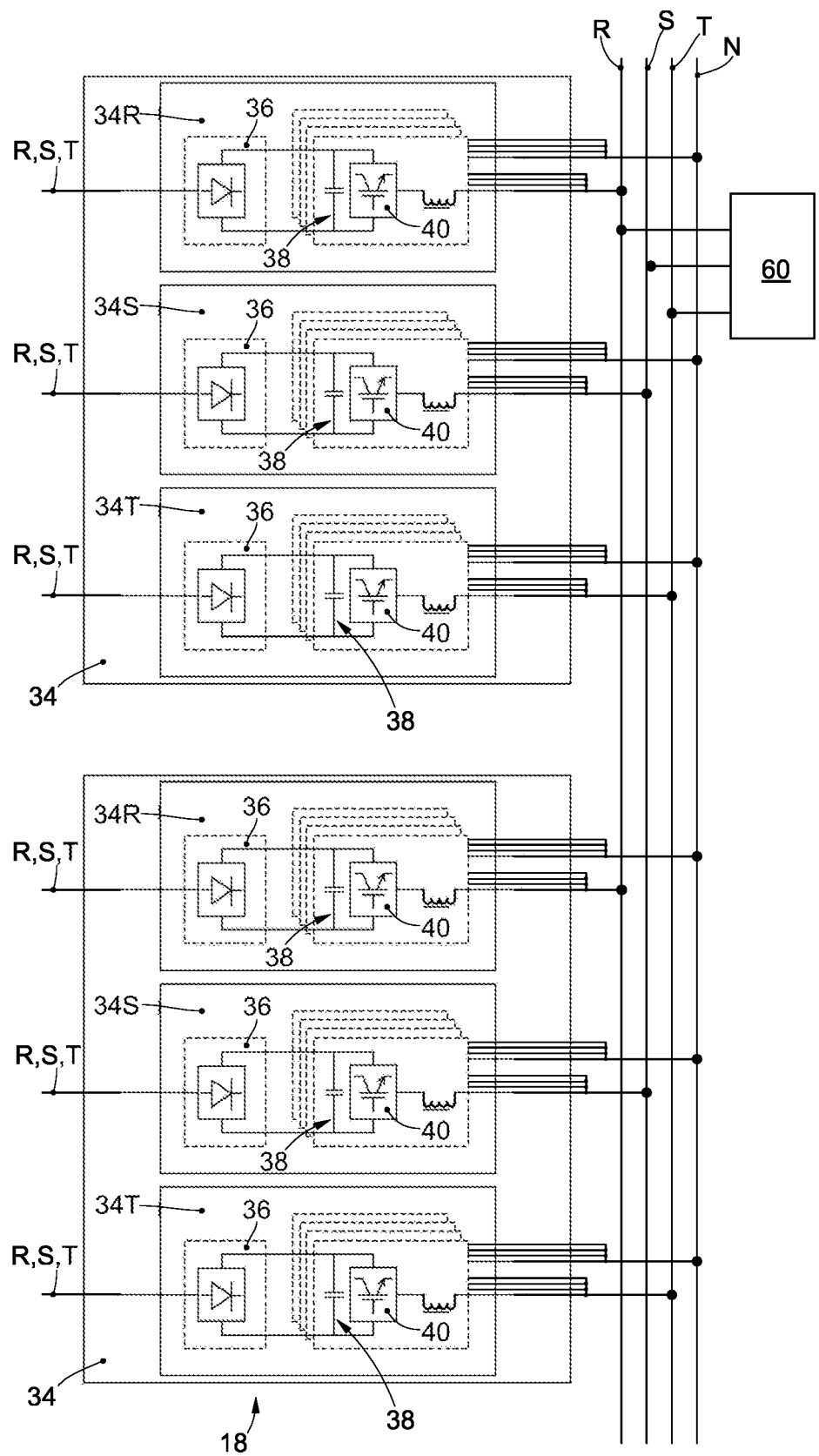
FIG. 2 is a detail of the diagram in FIG. 1 in accordance with some forms of embodiment described here.

The apparatus 10 is connected to a power network 50, for example a three phase electric network, indicated in FIG. 2 with the three phases R, S, T.

The power network 50 supplies the electrode 62 with the electric power needed for melting.

In particular, a power current Ii and a power voltage Ui are available from the power network 50, which are suitably supplied to the electrode 62 by means of the apparatus 10.

In accordance with some forms of embodiment, the apparatus 10 comprises detection devices 24, 26, configured to detect the quantities corresponding respectively to the power current Ii and to the power voltage Ui supplied by the power network 50.

The detection device 24 can be, for example, an ammeter, or an ammeter transformer, configured to detect the intensity of the power current Ii, while the detection device 26 can be, for example, a voltmeter, or a voltmeter transformer, configured to detect the power difference, that is the power voltage Ui.

In accordance with some forms of embodiment, the apparatus 10 comprises an electric regulation unit 12 interposed and connected to the power network 50 and to the electrode 62 and configured to regulate at least one electric power quantity of the one or more electrodes 62 of the electric arc furnace 60, and to guarantee the stability of the electric arc.

In accordance with a possible formulation of the present invention, the regulation of the electric quantity provides to regulate the intensity and the frequency of the electric power current.

In accordance with a possible variant, the regulation of the electric quantity provides to regulate the frequency, the wave form and the amplitude of the power voltage, allowing to control the current supplied and consequently the melting power.

In accordance with some forms of embodiment, the electric regulation unit 12 comprises a converter device 18 configured to convert the power current Ii and the power voltage Ui of the power network 50 to arc current Ia values and arc voltage UA values to power the electrode 62.

In accordance with some forms of embodiment, the converter device 18 comprises a plurality of modules 34 each comprising a phase sub-module 34R, 34S, 34T for each of the phases R, S, T of the power current.

The modules 34 are connected in parallel with each other and with the power network 50 and are each configured to convert the power current Ii and the power voltage Ui.

The phase sub-modules 34R, 34S and 34T allow to manage the conversion of power current Ii and power voltage Ui for each phase R, S and T.

In accordance with FIG. 1 three modules 34 are provided even if the number of modules could be fewer or more than three.

In accordance with some forms of embodiment (FIG. 2), each phase sub-module 34R, 34S, 34T comprises a straightening circuit 36, configured to straighten and possibly regulate the respective phase current supplied by the power network 50.

The straightening circuit 36 can be achieved for example by means of a controlled diode bridge or thyristor bridge.

In accordance with some forms of embodiment described using FIG. 2, each phase sub-module 34R, 34S, 34T comprises an intermediate circuit 38 in direct current, also called DC-link, configured to store energy and create a separation between the external power network 50 and the electrode 62, and an inverter circuit 40, configured to invert the current regulating the frequency and possibly the amplitude of the fundamental of the alternate current at exit.

The presence of an intermediate circuit 38 for each inverter circuit 40 that powers the same phase on the electrode side allows to compensate the disturbances coming from the arc, limiting their negative effect on the power network 50.

In accordance with some forms of embodiment, the inverter circuit 40 is a multi-impulse commutation circuit. In possible implementations the inverter circuit 40 can provide a twelve-impulse modulation, or multiples of twelve, that is, twenty-four or thirty-six impulses for example.

This allows to considerably reduce the undesired contribution of harmonics higher than the fundamental, generally 50 Hz or 60 Hz, and that cause loss of efficiency. Moreover, harmonics higher than the fundamental can induce disturbances in the power network that can be harmful for possible other user appliances connected to the power network.

Harmonics higher than the fundamental do not contribute to the transfer of active power, they can generate disturbances on the power network, and consequently it is better if they are reduced as much as possible.

In accordance with some forms of embodiment, the star centers of the individual power phase sub-modules 34R, 34S, 34T are connected to each other to the neutral N. In this way, even if a phase sub-module 34R, 34S, 34T switches off, it is possible in any case to have a modulation with the expected number of impulses. On the contrary, if the star centers of the phase sub-modules 34R, 34S, 34T are not connected to each other, if one of them switches off, or has a malfunction, a source of impulses is lost.

In accordance with some forms of embodiment, the inverter circuit 40 comprises a plurality of devices chosen from semi-conductors, diodes, thyristors such as SCR (Silicon Controlled Rectifier), triac, GTO (Gate Turn-Off thyristor), IGCT (Integrated Gate-Commutated Tyristor), MCT (Metal-Oxide Semiconductor Controlled Thyristor), transistors such as BJT (Bipolar Junction Transistor), MOSFET (Metal-Oxide Semiconductor Field-Effect Transistor), IGBT (Insulated-Gate Bipolar Transistor).

In accordance with some forms of embodiment, one or more modules 34 are provided of the straightening circuit 36, of the intermediate circuit 38 and of the inverter circuit 40 for each of the phases R, S and T to be powered.

In accordance with some forms of embodiment, several inverter circuits 40 for each phase R, S and T can be provided, located in parallel with each other.

The use of semi-conductor devices allows to control the current at any moment, even very rapidly, by switching the device on and off.

In accordance with some forms of embodiment, not shown in the drawings, the inverter circuits 40 can be provided with protections that intervene instantaneously, protecting the semi-conductor devices and therefore the inverter circuit 40 itself.

In accordance with some forms of embodiment, each phase sub-module 34R, 34S, 34T can comprise a straightening circuit 36 and four units, each consisting of an intermediate circuit 38 and an inverter circuit 40.

In accordance with some forms of embodiment, the straightening circuits and the inverter circuits are the same for each of the modules 34, so as to minimize the number of spare parts that need to be available, facilitating possible substitutions and maintenance.

Moreover, toward the power network 50, the modules 34 appear as balanced three-phase loads.

In accordance with some forms of embodiment (FIG. 1), at least one detection device to detect the electric quantity is interposed between the electrode 62 and the electric regulation unit 12, in this case two detection devices, that is, respectively one current detection device 20, to detect the arc current IA, and one voltage detection device 22 to detect the arc voltage UA for powering the electric arc.

The current detection device 20 can be an ammeter or an ammeter transformer for example, configured to detect the intensity of the arc current IA, that is, the intensity of the current supplied to the electrodes 62 by the electric regulation unit 12. The voltage detection device 22 can be a voltmeter, or a voltmeter transformer, configured to detect the difference in potential, that is, the arc voltage UA of the electrodes 62, which depends on the distance of the electrodes 62 with respect to the metal mass to be melted.

In accordance with some forms of embodiment (FIG. 1), the apparatus 10 comprises a control and command unit 16 connected to the electric regulation unit 12 and to the power network 50 and is configured to calculate at least a reference current value IR to be sent to the electric regulation unit 12 to determine a stable condition of the electric arc in the electric furnace 60.

The control and command unit 16 can also be configured to calculate a reference voltage value UR for other adjustments of the intensity of the electric arc, as will be explained hereafter.

The control and command unit 16 is configured to determine the reference values of the reference current IR and reference voltage UR at least on the basis of the power current Ii and the power voltage Ui supplied at entrance by the external power network 50 and of the arc current IA and the arc voltage UA detected by the detection devices 20 and 22.

In particular, the control and command unit 16 regulates the functioning of the electric regulation unit 12 so that the electric quantities—the arc voltage UA and arc current IA—reach an amplitude and relative phase shift such as to guarantee the arc is maintained and have an operating frequency that reduces losses to a minimum.

In accordance with the solution in FIG. 1, the control and command unit 16 comprises a power regulator 27 connected between the power network 50 and the electric regulation unit 12.

The power regulator 27 is configured to calculate the reference current IR, reference voltage UR and the frequency of the wave form.

A power reference value PS, for example a set-point power value, can be set in the power regulator 27, for example by a user.

In accordance with some forms of embodiment, the reference voltage UR is calculated as a function of the melting/working step and consequently the reference current IR is set so as to track the power reference PS set.

In accordance with some forms of embodiment, the control and command unit 16 can also comprise a processing unit 28 connected to the power regulator 27 and the detection devices 20, 22 and configured to determine, based on the entrance parameters relating to the arc current IA and the arc voltage UA, a mathematical model of the electric arc and to determine optimum functioning conditions to guarantee the stability of the arc and to regulate in the best possible way the power supplied based on the power reference PS.

According to a possible implementation, the processing unit 28 can be configured to calculate at least an ideal current value I0 and an ideal voltage value U0 corresponding to optimum functioning conditions of the electric arc and which can be supplied to the power regulator to determine the reference current IR and the reference voltage UR.

In accordance with some forms of embodiment, between the detection devices 22, 24 respectively of the arc current IA and the arc voltage UA and the control and command unit 16, in this case the processing unit 28, signal conditioning elements 30, 32 can be provided. Each signal conditioning element 30, 32 is configured to amplify and stabilize the signal relating to the arc current IA or the arc voltage UA based on a reference value that must be considered. The reference value can be the mean value, the instantaneous value or the actual value.

Each signal conditioning element 30, 32 allows to obtain at exit a stabilized current value and a stabilized voltage value IA', UA', stable and suitable to be processed by the processing unit 28.

According to possible variant forms of embodiment, not shown, the signal conditioning elements 30, 32 can be integrated in the control and command unit 16.

In accordance with some forms of embodiment (FIG. 1), the electric regulation unit 12 comprises a device to regulate the current 42 positioned between the control and command unit 16 and the converter device 18, and configured to receive at entrance the reference current value IR calculated by the control and command unit 16.

According to possible forms of embodiment, the current regulation device 42 can be a hysteresis regulator, or a PWM (Pulse-Width-Modulation) regulator, which allows to regulate the switching frequency of the inverters and the band occupation, and also allows to reduce the dissipation of the apparatus. The current regulation device 42 in particular determines the wave form of the arc current IA that must be fed to the electrode 62.

According to some forms of embodiment, the current regulation device 42 can determine a regulation of the converter device 18 to have a single current modulation with the same wave form for each electrode 62 provided.

In accordance with some forms of embodiment described using FIG. 1, the current regulation device 42 can also be connected to the signal conditioning elements 30, 32, to receive at entrance not only the value of the reference current IR but also the amplified and stabilized values of the stabilized current IA' and the stabilized voltage UA', and to process them to determine a command signal to be sent to the converter device 18.

According to a possible variant, the current regulation device 42 can determine a regulation of the converter device 18 to have an independent current modulation for each of the electrodes 62 provided.

According to one aspect of the present invention, the apparatus 10 comprises a positioning device 46 configured to move the at least one electrode 62 nearer to/away from the metal mass to be melted and in this way to regulate the melting power.

The variation in the position of the electrode 62 with respect to the metal mass determines the entity of voltage of the electric arc and therefore conditions the arc voltage UA which is detected by the voltage detection device 22.

By managing the position of the electrode 62 it is therefore possible to also carry out a control on the electric arc generated and the melting power supplied.

In accordance with possible forms of embodiment, the positioning device 46 can be connected to an electrode control device 44, configured to control the position of the electrodes and therefore to command the positioning device 46 so that the electric arc is stable.

The electrode control device 44 is connected at least to the voltage detection device 22 to manage the positioning of the electrode 62.

In accordance with a possible solution, the electrode control device 44 is also connected to the control and command unit 16 to command the activation of the positioning device 46 as a function both of the arc voltage UA and also of the reference voltage UR calculated by the control and command unit 16.

In particular, the electrode control device 44 regulates the positioning device 46 to take the arc voltage UA to the reference voltage UR.

In accordance with the form of embodiment in FIG. 1, the electrode control device 44 can be connected to the conditioning element 32 to receive therefrom the stabilized voltage value UA' relating to the arc voltage UA and as a function of the latter to control the positioning device 46.

According to possible implementations of the present invention, the positioning device 46 can be chosen from a group comprising at least one of either a mechanical actuator, an electric actuator, a pneumatic actuator, a hydraulic actuator, an articulated mechanism, a mechanical kinematism, similar and comparable members or a possible combination thereof.

According to possible variant forms of embodiment, not shown, the electrode control device 44 can be integrated in the control and command unit 16.

In accordance with some forms of embodiment, the control and command unit 16 receives at entrance the values of the power current Ii, the power voltage Ui, the arc current IA, the arc voltage UA and possibly the power reference value PS.

The control and command unit 16 processes the data received and determines the values of reference current IR and reference voltage UR, and sends them respectively to the electric regulation unit 12 and the voltage regulation unit 14.

In this way, the control and command unit 16 performs a control in feedback both of the arc current IA and also the arc voltage UA powering the electrodes 62, allowing to compensate possible deviations thereof with respect to the ideal current value I0 and the ideal voltage value U0.

In accordance with some forms of embodiment, moreover, the control and command unit 16, comparing the set-point power value PS with the actual power current Ii and the power voltage Ui and the arc current IA and the arc voltage UA, calculates the reference current IR, the reference voltage UR and the frequency of the wave form for both, so as to optimize the power supply to the electrodes 62.

In this way, the values of the reference current IR and the reference voltage UR can be used independently to carry out respectively a first control on the electric arc by acting on the electric regulation unit 12, and a second control on the electric arc by acting on the positioning device 46.

In particular, the first control can be carried out to compensate sudden variations in the current of the electric arc and to prevent possible damage to electric components, while the second control allows to regulate the electric arc at a lower frequency, compensating variations in the arc voltage that are gradual and predictable over time, determined for example on the basis of standard functioning conditions.

This double control allows to solve problems of instability of the load, especially in the initial start-up step, when the load is always unbalanced, simplifying maintenance of the electric arc and allowing to compensate non-standard functioning conditions that cannot be foreseen in advance.

This solution also prevents damage to the walls of the electric arc furnace 60, for example caused by short circuits due to temperature differences: it also reduces wear to which the electrodes 62 are subjected over time. This allows to reduce the frequency of maintenance that has to be carried out in the apparatus 10 and the electric arc furnace 60.

It is clear that modifications and/or additions of parts may be made to the apparatus and method as described heretofore, without departing from the field and scope of the present invention.

It is also clear that, although the present invention has been described with reference to some specific examples, a person of skill in the art shall certainly be able to achieve many other equivalent forms of apparatus and method, having the characteristics as set forth in the claims and hence all coming within the field of protection defined thereby.

The invention claimed is:

1. Electric power supply apparatus for an electric arc furnace comprising at least one electrode, said electric power supply apparatus being electrically connectable to a power network to supply to said electrode electric energy to generate an electric arc to melt a metal mass, said power network being a three phase electric network with three phases, each phase providing a network current, said network current being alternate current (AC), said apparatus comprising an electric regulation unit interposed between and electrically connected to the power network and to the electrode and configured to regulate at least one of a current or a voltage for powering said electrode, wherein said apparatus comprises at least one detection device interposed between the electrode and said electric regulation unit and configured to detect said at least one of the current or the voltage, a positioning device configured to move the at least one electrode nearer to/away from the metal mass to be melted, and a controller electrically connected to said electric regulation unit, to said power network, and to said positioning device, said controller being configured to control said electric regulation unit and said positioning device, wherein said electric regulation unit comprises a converter device configured to convert the network current into the electric energy to generate the electric arc at said electrode, wherein said converter device includes a plurality of modules electrically connected in parallel with each other and each of said modules is electrically connected to all of said three phases of the power network, wherein each of said modules comprises three sub-modules, each of the three sub-modules coupled to a respective phase of the three phases, wherein each of said three sub-modules comprises (i) a straightening circuit configured to rectify and regulate the network current to generate a straightened current, (ii) an intermediate circuit configured to store direct current (DC) energy from the straightened current, and (iii) an inverter circuit configured to invert the straightened current from the intermediate circuit by regulating a frequency and an amplitude of a fundamental harmonic of another alternating current providing the energy to the electrode, wherein said apparatus comprises a hysteresis regulator configured to regulate the switching frequency of said inverter circuits and their band occupation.

2. The apparatus as in claim 1, wherein said controller is configured to calculate at least a reference current value and regulate said electric regulation unit based upon said reference current value, and wherein said controller is further configured to calculate a reference voltage value and regulate said positioning device based upon said reference voltage value.

3. The apparatus as in claim 2, further comprising a current detection device to detect an arc current, and a voltage detection device to detect an arc voltage, said current detection device and said voltage detection device being electrically connected to said controller.

4. The apparatus as in claim 3, wherein said converter device is configured to convert the network current and a network voltage of the power network to the arc current and the arc voltage, respectively, and wherein said hysteresis regulator is electrically connected between said controller and said converter device, and is configured to receive said reference current value calculated by the controller.

5. The apparatus as in claim 1, wherein said positioning device is electrically connected to an electrode controller, configured to control the positioning device, said electrode controller being electrically connected at least to a voltage detection device and being configured to control the positioning device based upon an arc voltage and a reference voltage calculated by the controller.

6. The apparatus as in claim 1, wherein each phase sub-module is electrically connected with a star connection and each star center of each phase sub-module is electrically connected to each star center of each other phase sub-module and to a neutral connection.

7. The apparatus as in claim 1, wherein said intermediate circuit is a DC-link.

8. The apparatus as in any claim 1, wherein said inverter circuit includes one or more of the following: semi-conductors, diodes, thyristors, or transistors.

9. The apparatus as in claim 1, wherein said straightening circuit includes a controlled diode bridge or thyristor bridge.

* * * * *